United States Patent
Menendez et al.

(10) Patent No.: US 10,908,708 B1
(45) Date of Patent: Feb. 2, 2021

(54) RUGGEDIZED ACTIVE STYLUS WITH A SINGLE MECHANISM TO ENABLE ACCESS TO TWO SEPARATE CHAMBERS

(71) Applicant: Dell Products L.P., Round Rock, TX (US)

(72) Inventors: Mark David Menendez, Austin, TX (US); Jeff Walter Wirtz, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/681,873

(22) Filed: Nov. 13, 2019

(51) Int. Cl.
*G06F 3/0354* (2013.01)
*H01M 2/10* (2006.01)

(52) U.S. Cl.
CPC ...... *G06F 3/03545* (2013.01); *H01M 2/1055* (2013.01); *H01M 2220/30* (2013.01)

(58) Field of Classification Search
CPC ............ G06F 3/03545; H01M 2/1055; H01M 2/2203
See application file for complete search history.

(56) References Cited

U.S. PATENT DOCUMENTS

| | | | |
|---|---|---|---|
| 2012/0146913 A1* | 6/2012 | Linn | G06F 3/041 345/169 |
| 2015/0123932 A1* | 5/2015 | Collins | G06F 3/044 345/174 |
| 2019/0171305 A1* | 6/2019 | Trutna | H01M 2/1022 |

* cited by examiner

*Primary Examiner* — Yaron Cohen
(74) *Attorney, Agent, or Firm* — Campbell Stephenson LLP

(57) ABSTRACT

In some examples, an active stylus may include a main portion and a top portion. The main portion may include a dry chamber used to store a battery. The top portion may include a wet chamber to store spare nibs. The wet chamber may be accessed to replace a damaged nib with a spare nib. When the top portion is fully mated with the main portion of the stylus, turning the top portion, in a first direction, relative to the main portion until the detent is reached and pulling the top portion from the main portion enables access to the wet chamber. Turning the top portion of the active stylus, in the first direction, relative to the main portion past the detent, until the top portion detaches from the main portion, enables access to the dry chamber.

20 Claims, 7 Drawing Sheets

US 10,908,708 B1

RUGGEDIZED ACTIVE STYLUS WITH A SINGLE MECHANISM TO ENABLE ACCESS TO TWO SEPARATE CHAMBERS

BACKGROUND OF THE INVENTION

Field of the Invention

This invention relates generally to an active stylus and more particularly to a ruggedized stylus that uses a single mechanism to enable access to a first chamber (e.g., wet chamber) that may be exposed to the external environment (e.g., liquids, particulate matter, and the like) and a second chamber (e.g., dry chamber) that may be protected from the external environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An active stylus, also known as an active pen or simply stylus, may be used to provide input to a computing device that has a touchscreen display device. A ruggedized stylus may be used in environments where the ruggedized stylus is exposed to a hostile environment (e.g., snow, rain, dust, and the like). For example, package delivery services (e.g., United Parcel Service (UPS), FedEx, the postal service, and the like) may obtain a signature from a recipient when delivering a valuable item and may use a ruggedized stylus to obtain the signature because the recipient may be outside. As another example, scientists may use a ruggedized stylus with a ruggedized computing device to take notes in adverse weather conditions.

When a ruggedized stylus is used in a hostile environment, the ruggedized stylus may be dropped more often (e.g., as compared to an active stylus that is used indoors) because (i) the hostile environment may cause the exterior of the ruggedized stylus to be slick and (ii) the user may wear gloves to protect the user's hands from the hostile environment. A manufacturer of a ruggedized stylus has two options when it comes to the nib (e.g., the portion of the stylus that makes contact with the touchscreen). If the manufacturer ruggedizes the nib, then the user experience in terms of nib/touchscreen interaction may be adversely affected. However, if the manufacturer uses a standard nib (e.g., from an active stylus that is typically used indoors), then the nib may be damaged when the ruggedized stylus is dropped. When the nib is damaged, the accuracy of the ruggedized stylus may suffer and the user experience with the nib/touchscreen interaction may suffer.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, an active stylus may include a main portion and a top portion. The main portion may include a dry chamber used to store a battery. The top portion may include a wet chamber to store spare nibs. When the top portion is fully mated with the main portion of the stylus, turning the top portion, in a first direction, relative to the main portion until the detent is reached and pulling the top portion from the main portion enables access to the wet chamber. For example, the wet chamber may be accessed to replace a damaged nib with a spare nib. Turning the top portion of the active stylus, in the first direction, relative to the main portion past the detent, until the top portion detaches from the main portion, enables access to the dry chamber. For example, the dry chamber may be accessed to replace the battery.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
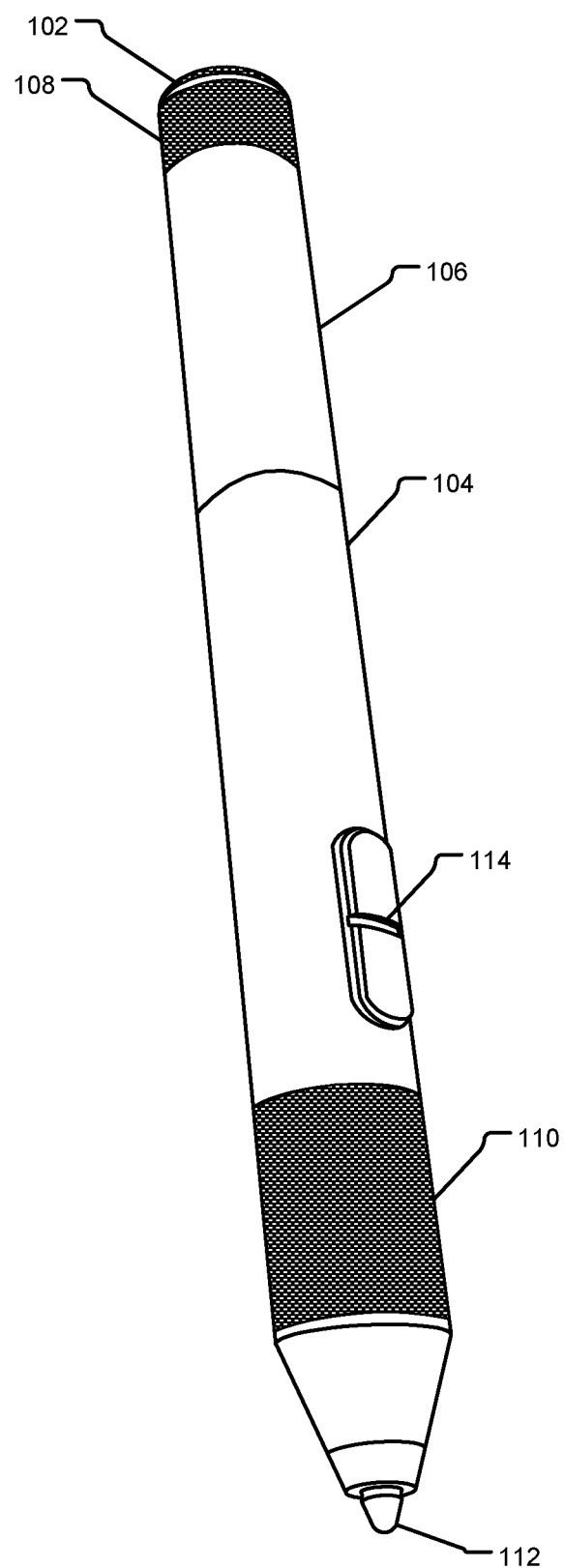
FIG. 1 illustrates an exterior view of an active stylus, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As used herein, the term active stylus, also referred to as an active pen, refers to an input device that includes electronic components to enable a user to write directly onto a touchscreen display device that is connected to a computing device (e.g., smartphone, tablet, 2-in1, laptop, or the like). An active stylus may include features such as, for example, touch sensitivity, input buttons, memory, writing data transmission capabilities, and an electronic eraser. The active stylus may include electronic components that wirelessly transmit data to the computing device such as, for example, pen location, pressure (e.g., pressure being applied to the nib), button presses, and the like. While the examples provided herein relate to a ruggedized stylus, e.g., an active stylus designed for use in a hostile environment, the systems and techniques described herein may also be used with an active stylus (e.g., non-ruggedized) that is not designed for use in hostile environments. Typically, a ruggedized stylus is used with a ruggedized computing device.

The systems and techniques described herein use a single mechanism to enable access to two different chambers of an active stylus (e.g., a type of information handling system). For example, the active stylus may include a first chamber, also referred to as a wet-zone or wet chamber, to store one or more spare nibs. The first chamber may be opened when the active stylus is in a hostile environment, such as rain, snow, or the like. Thus, the first chamber can be exposed to water or other elements without adversely affecting the operation of the pen because the first chamber is used to store spare nibs, which are unaffected by exposure to water, debris, or the like. The first chamber may be sealed off (e.g., using a gasket) from other portions of the active stylus to keep water, debris, or the like in the first chamber and prevent water, debris, and the like from entering other portions of the active stylus. In this way, when a user who is operating the active stylus in a hostile environment drops the active stylus and damages the current nib, the user can access the first chamber, remove a spare nib, and replace the current nib with the spare nib, thereby exposing only the first chamber to the hostile environment, while the remainder of the active stylus remains protected from the hostile environment.

The active stylus may include a second chamber that provides access to a battery that is used to power the active stylus. In some cases, the second chamber may also provide access to other electronic components included in the active stylus. The second chamber may be referred to as a dry-zone or dry chamber, because the second chamber is intended to be kept dry and is not intended to be exposed to water, debris, and the like that may be found in a hostile environment. For example, water ingress into the dry chamber could cause the battery or the electronics to short circuit, thereby causing the active pen to malfunction. Thus, the second chamber is intended to be accessed in a controlled environment (e.g., indoors) that is dry rather than in a hostile environment. The second chamber may be sealed off (e.g., using a gasket) from other portions of the active stylus to keep water, debris, or the like out of the second chamber. When a user is operating the active stylus in a hostile environment and determines that the current battery is to be replaced, the user may exit the hostile environment and enter a controlled environment (e.g., indoors), replace the current battery with a new battery, and then re-enter the hostile environment. In this way, the user may prevent water, debris, or the like that may be present in the hostile environment from entering into the second chamber.

The active stylus may include at least two portions, e.g., a top portion and a main portion. The top portion may have an inner thread that screws on to (e.g., mates with) an exterior thread of the main portion. The portion of the stylus where the top portion screws on to the main portion of the stylus may include a detent that is used to mechanically resist the rotation of the top portion when the top portion is being unscrewed from the main portion. The detent may be used to divide the rotation between the top portion and the main portion into two separate movements, e.g., a first movement where the top portion is unscrewed from the main portion sufficiently to reach the detent and a second movement where the top portion is unscrewed past (e.g., after reaching) the detent. Because the detent provides resistance, the detent is able to provide the user's hand with mechanical feedback indicating when the top portion has been unscrewed a sufficient amount to reach the detent.

After the top portion is completely screwed into the main portion, unscrewing the top portion until the detent is reached (e.g., less than one full turn, and typically between about a quarter turn to about a half turn), enables the user to pull the top portion off to access the wet chamber (e.g., used to store spare nibs). After the top portion is completely screwed into the main portion, unscrewing the top portion past the detent (e.g., at least one and a half turns) until the top portion is completely unscrewed off of the main portion enables the user to access the dry chamber (e.g., used to store the battery). In this way, a partial twist of the top portion (e.g., until the detent is reached) followed by pulling the top portion (e.g., to separate the top portion from the main portion) enables the user to quickly access a spare nib in a hostile environment. In contrast, unscrewing the top portion past the detent, until the top portion is completely unscrewed from the main portion, a longer and more deliberate action, enables the user to access the dry chamber to replace the battery. Because the battery may last several months, the user may access the dry chamber infrequently.

Thus, to access the nib storage (e.g., the wet chamber) the user twists the top portion (also referred to as the endcap) in a particular direction (e.g., counter-clockwise) until a click (e.g., provided by the top portion encountering the detent) is felt and then slide the top portion off to access the spare nibs. To access the battery (e.g., the dry chamber), the user twists the top portion in the particular direction (e.g., counter-clockwise) past the click (e.g., past the detent) to engage the threads and open the seal of the dry chamber.

As an example, an active stylus may be used with a computing device having a touchscreen display device. For example, manipulating the active stylus on the touchscreen display device may cause the computing device to wirelessly receive input from the active stylus. The active stylus may include (i) a main portion and (ii) a top portion. The main portion may include a dry chamber and a threaded wall to prevent foreign matter from entering into the dry chamber. The dry chamber may be used to store a battery to power the active stylus. Protecting the dry chamber from liquids, foreign particles, and the like may prevent the battery (and electronics of the active stylus) from being shorted. For example, if the battery was shorted, the active stylus may become damaged and malfunction or stop functioning entirely. The top portion may include a wet chamber having a detent. The wet chamber of the active stylus may be used to store a cylinder and a plurality of spare nibs. For example, if the active stylus is dropped and a nib in a tip of the stylus is damaged, the wet chamber may be accessed to replace the damaged nib with one of the spare nibs. Threads located on an inner surface of the top portion may mate with exterior threads of the threaded wall. When the top portion is fully mated with the main portion of the stylus, turning the top portion, in a first direction, relative to the main portion until the detent is reached and pulling the top portion from the main portion enables access to the wet chamber. Turning the top portion of the active stylus, in the first direction, relative to the main portion past the detent, until the top portion detaches from the main portion, enables access to the dry chamber. The top portion, the main portion or both may include at least one of: carbon fiber, aluminum or an aluminum alloy, a titanium alloy, high-density polyethylene (HDPE), or polyoxymethylene (POM). The active stylus may include one or more mechanical buttons that are sealed using a boot.

As another example, a computing device may include a touchscreen display device and an active stylus. The active stylus may include a cylindrical-shaped (e.g., tubular) main portion and a cylindrical-shaped top portion. The main portion may include a dry chamber and a threaded wall that includes a male coupler having a threaded outer wall. The top portion may include a wet chamber to store a detent and a female coupler having inner threads located on an inner surface of the top portion to mate with exterior threads of the male coupler of the threaded wall. The top portion is configured to mate with the main portion by attaching (e.g., by engaging the exterior threads of the male coupler with the inner threads of the female coupler) to seal the dry chamber to prevent foreign matter from entering into the dry chamber. Turning the top portion, in a first direction, relative to the main portion until the detent is reached and pulling the top portion from the main portion disengages the top portion from the main portion to provide access to the wet chamber. Turning the top portion of the active stylus, in the first direction, relative to the main portion and past the detent until the top portion detaches from the main portion provides access to the dry chamber. At least one of (i) the top portion or (ii) the main portion of the active stylus are comprised of one of: carbon fiber, aluminum or an aluminum alloy, a titanium alloy, high-density polyethylene (HDPE), or polyoxymethylene (POM). The active stylus may include one or more mechanical buttons that are sealed using a boot. The dry chamber may be used to store a battery to power the active stylus. The wet chamber of the active stylus may be used to store a cylinder, and a plurality of spare nibs.

FIG. 1 illustrates an exterior view of an active stylus, according to some embodiments. A stylus 102 may include a main portion 104, a top portion (e.g., endcap) 106, and a nib 112. The top portion 106 may include a top grip 108 (e.g., knurl) to enable a user to grip the top portion 106 when engaging (e.g., screwing in and/or pushing in) the top portion 106 to the main portion 104 or disengaging (e.g., screwing out and/or pushing out) the top portion 106 from the main portion 104. In some cases, the top grip 108, the bottom grip 110 or both may be knurled portions of the top portion 106 and the main portion 104, respectively. In other cases, the top grip 108 and the bottom grip 110 may be applied as a coating or a band and me be comprised of nitrile rubber (NBR), latex, natural rubber, silicone rubber, or polyvinyl chloride (PVC).

The main portion 104 may include a bottom grip 110 (e.g., knurl) to enable a user to grip the stylus 102 similar to gripping a pen or a pencil, e.g., between the thumb and forefinger. The main portion 104 may include one or more buttons 114. For a ruggedized stylus, the buttons 114 may be sealed (e.g., using a boot or other mechanism) to prevent substances such as salt, fluids, fungus, oil, dirt, or the like from entering into the stylus 102. The buttons 114 may be (i) toggle switches that are actuated by a mechanical lever, a rocking system, or the like or (ii) push button switches that are actuated by pressure (e.g., either momentary or latching switches). While two buttons are illustrated in FIG. 1, more or fewer buttons may be used depending on how the stylus 102 is designed.

The nib 112 may be inserted into one end of the main portion 104 of the stylus 102 and may be removed and replaced with a new nib. For example, the nib 112 may be approximately cylindrical in shape and may include a groove around the circumference of the nib 112. Spring loaded jaws in one end of the main portion 104 may grasp the nib 112 around the groove.

In some cases, the stylus 102 may be a ruggedized stylus designed to be used in hostile environments where liquids (e.g., water, oil etc.), particulate matter, and the like are present and may come in to contact with the stylus 102. For ruggedization, the stylus 102 may be manufactured using one or more types of materials, such as, for example, carbon fiber, aluminum (or another metal or metal alloy), high-density polyethylene (HDPE), polyoxymethylene (POM), or the like and may include multiple seals (e.g., gaskets) to prevent liquids and particulate matter from entering into the stylus 102.

The stylus 102 may have a length of between 5 inches and 7 inches, such as, for example, a length of 6 inches. The stylus 102 may have a diameter of between about 0.25 inches to about 0.5 inches, such as, for example, 0.375 inches.

Figure 2:
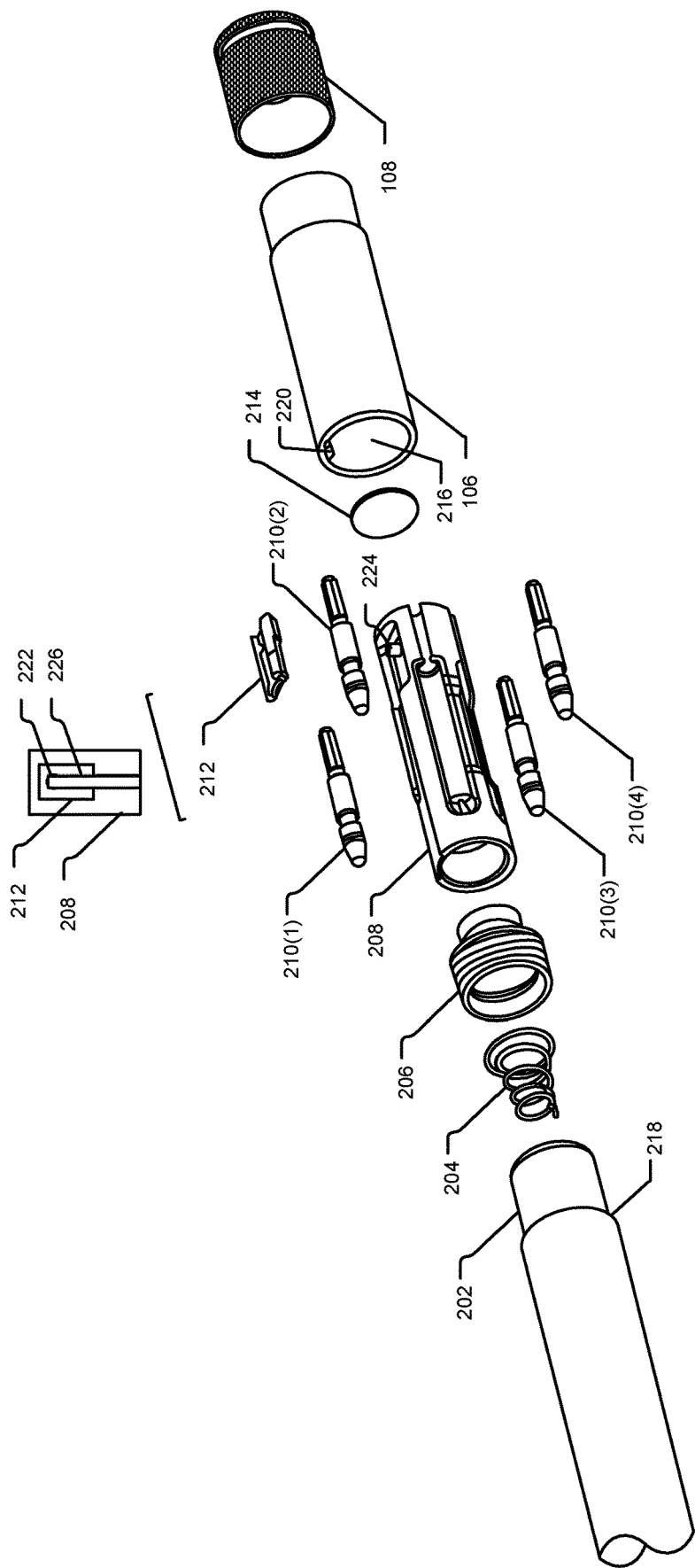
FIG. 2 illustrates an exploded view showing components of an active stylus, according to some embodiments.

FIG. 2 illustrates an exploded view showing components of an active stylus, according to some embodiments. The main portion 102 may be hollow to provide a dry chamber 218 to store a battery 202 (e.g., used to power the stylus 102). A spring 204 may be located between a threaded wall 206 and the main portion 104. The threaded wall 206 may prevent liquids, debris, and other matter from the environment from entering into the dry chamber 218. The threaded wall 206 has threads on an exterior surface to enable the top portion 106 to screw into (e.g., to attach to) the main portion 104. In some cases, the threaded wall 206 may include a gasket made of silicon, rubber, or the like to seal the dry chamber to prevent liquids, particulate matter, and the like from entering into the dry chamber.

The threaded wall 206 may be attached to a cylinder 208. The cylinder 208 may hold (e.g., using indentations, as illustrated in FIG. 2) one or more nibs, such as, for example, spare nibs 210(1), 210(2), 210(3), 210(4). The indentations in the cylinder 208 may securely hold the spare nibs 210 in place to prevent the spare nibs 210 from rattling and to prevent the spare nibs 210 from falling out when the wet chamber 216 is opened to access the spare nibs 210. While four spare nibs 210 are illustrated in FIG. 2, the number of spare nibs 210 that can be stored in the cylinder 208 may vary (e.g., 4, 6, or 8 spare nibs) depending on the size of each of the spare nibs 210, a diameter of the stylus 102, and the like.

The cylinder 208 may include an indentation to hold a detent 212 that provides mechanical feedback when a user is turning the top portion 106 in a particular direction relative to the main portion 104. For example, turning the top portion 106 in a particular direction relative to the main portion 104 between about a quarter turn to about three quarters of a turn may cause the top portion 106 to encounter the detent 212. The detent 212 may be made using high-density polyethylene (HDPE), polyoxymethylene (POM), or another type of plastic.

A gasket 214 (e.g., silicone pad) may be placed at one end (e.g., top end) of the top portion 106 to provide sound insulation from the sound of the spare nibs 210. The top portion 106 may be hollow to provide a wet chamber 216 to house the cylinder 208 and the spare nibs 210. The wet chamber 216 may include a small protrusion 220 that, when the top portion 106 is being turned, makes contact with the detent 220 to provide feedback that the detent 220 has been reached. The detent 212 may include a circular opening 222 that fits over a cylindrical protrusion 224 in the cylinder 208 to hold the detent 212 in place in the cylinder 208. When the top portion 106 is being turned, the small protrusion 220 makes contact with the detent 212 to provide feedback that the detent 220 has been reached. Pulling on the top portion 106 after the small protrusion 220 makes contact with the detent 212 causes the small protrusion 220 to pull on the detent 212. Because the detent 212 is held in place in the cylinder 208, pulling on the top portion 106 causes the cylinder 208 (and the spare nibs 210) to be exposed, as illustrated further in FIG. 3.

The detent 212 and the top portion 106 are designed to interact with each other in two ways, with a first interaction enabling access to the wet chamber 216 and a second interaction enabling access to the dry chamber 218. After the top portion 106 is mated to the main portion 104, twisting (e.g., rotating) the top portion 106 in a particular direction to engage the detent 212 and then pulling the top portion 106 away from the main portion 104 causes the top portion 106 to separate (e.g., disengage) from the main portion 104, enabling access to the wet chamber 216. After the top portion 106 is mated to the main portion 104, twisting the top portion 106 in the particular direction to engage the detent 212 and then continuing to rotate the top portion 106 relative to the main portion 104 causes the top portion 106 to separate (e.g., disengage) from the main portion 104, enabling access to the dry chamber 218. While a particular detent 212 and top portion 106 (with protrusion 220) is illustrated in FIG. 2, the mechanical design may be varied to achieve similar results.

Thus, when the top portion 106 is screwed into the main portion 104, (i) the cylinder 208 and the spare nibs 210 may be stored in the wet chamber 216 that is inside the top 106 and (ii) the battery 202 and the spring 204 may be stored in the dry chamber 218 that is inside the main portion 104 of the stylus 102. Unscrewing the top portion 106 until the detent 212 is reached (e.g., less than one full turn, and typically between about a quarter turn to about a half turn), enables the user to pull the top portion 106 off to access the wet chamber 216 that is used to store the spare nibs 210. When the top portion 106 is completely screwed into the main portion 104, unscrewing the top portion 106 past the detent 212 (e.g., at least one and a half turns) until the top portion 106 (including the threaded wall 206) is completely unscrewed and detached from the main portion 104 enables the user to access the dry chamber 218 that is used to store the battery 202. In this way, a partial twist of the top portion 106 (e.g., until the detent 212 is reached) followed by pulling the top portion 106 (e.g., to separate the top portion 106 from the main portion 104) enables the user to quickly access one of the spare nibs 210, regardless of whether the user is in a hostile environment. In contrast, unscrewing the top portion 106 past the detent 212, until the top portion 106 is completely unscrewed from the main portion 104, enables the user to access the dry chamber 218 to replace the battery 202. Because the battery 202 may last several months, the user may access the dry chamber 218 infrequently.

Thus, to access the nib storage (e.g., the wet chamber) the user twists the top portion (also referred to as the endcap) in a particular direction (e.g., counter-clockwise) until the user receives tactile feedback (e.g., via a click provided by the top portion encountering the detent) is felt and then slides the top portion off to access the spare nibs. To access the battery (e.g., the dry chamber), the user twists the top portion in the particular direction (e.g., counter-clockwise) past the click (e.g., past the detent) to engage the threads and open the seal of the dry chamber.

Figure 3A:
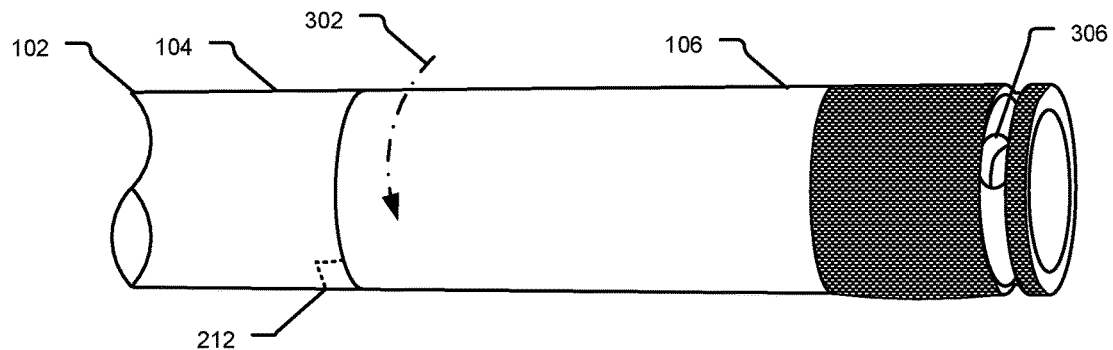
FIG. 3A, FIG. 3B, and FIG. 3C illustrate accessing a first compartment in an active stylus that stores spare nibs, according to some embodiments.
Figure 3B:
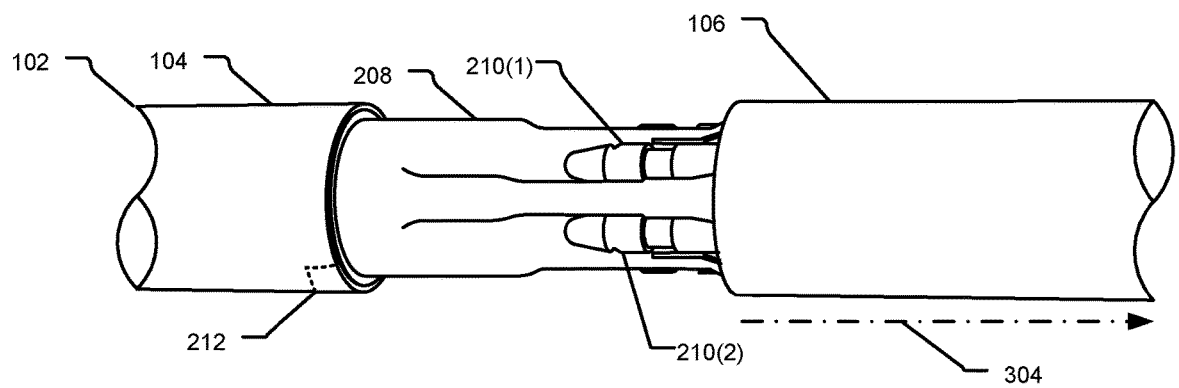
Figure 3C:
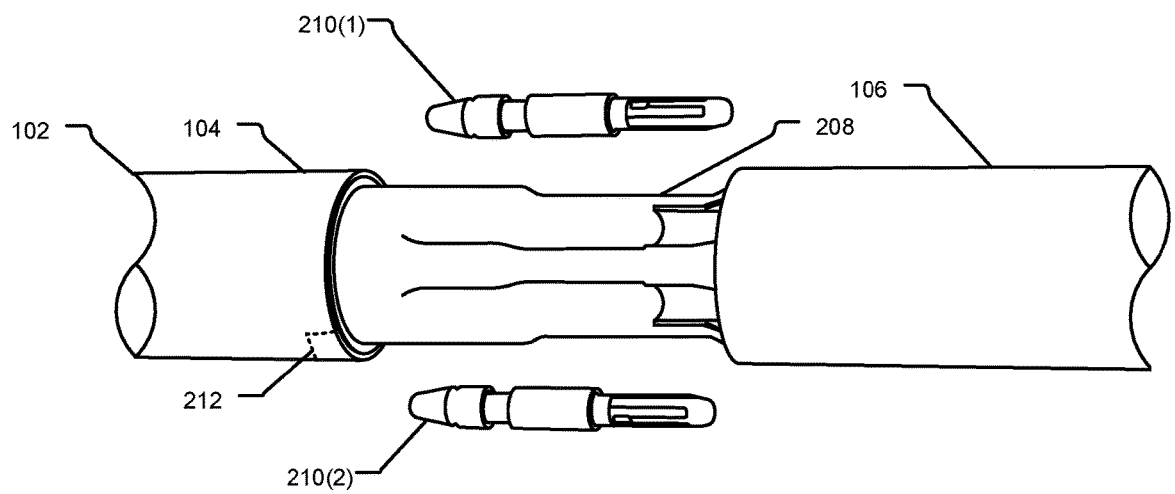

FIG. 3A, FIG. 3B, and FIG. 3C illustrate accessing a first compartment in an active stylus that stores spare nibs, according to some embodiments.

FIG. 3A illustrates turning the top portion 106 in a counter-clockwise direction 302 until the detent 212 is reached. For example, a user may grasp the main portion 104 using one hand and grasp the top portion 106 (e.g., at the top grip 108) using another hand and turn the top portion 106 in a counter-clockwise direction 302 until the detent 212 is reached. The top portion 106 may include a hole 306 (e.g., along the diameter of the cylinder) to store a tool to remove the nib 112 and attach one of the spare nibs 210.

FIG. 3B illustrates pulling the top portion 106 away from the main portion 104, after turning the top portion 106 in the counter-clockwise direction 302 until the detent 212 is reached, to access the wet chamber 216. For example, a user may grasp the main portion 104 using one hand and grasp the top portion 106 (e.g., at the top grip 108) using another hand and pull the top portion 106 away 304 from the main portion 104 to access the wet chamber 216.

FIG. 3C illustrates accessing one of the spare nibs 210 in the wet chamber 216. For example, after pulling the top portion 106 away 304 from the main portion 104 to access the wet chamber 216, the user may access one of the spare nibs 210. Note that the spare nib 210(3) and 210(4) are not visible as they are on the opposite side of the cylinder from the spare nib 210(1) and 210(2).

Thus, when the top portion 106 is screwed into the main portion 104, the cylinder 208 and the spare nibs 210 may be stored in the wet chamber 216 that is inside the top 106. Unscrewing the top portion 106 until the detent 212 is reached (e.g., less than one full turn, and typically between about a quarter turn to about a half turn), enables the user to pull the top portion 106 away from the main portion 104 to access the wet chamber 216 that is used to store the spare nibs 210.

Figure 4A:
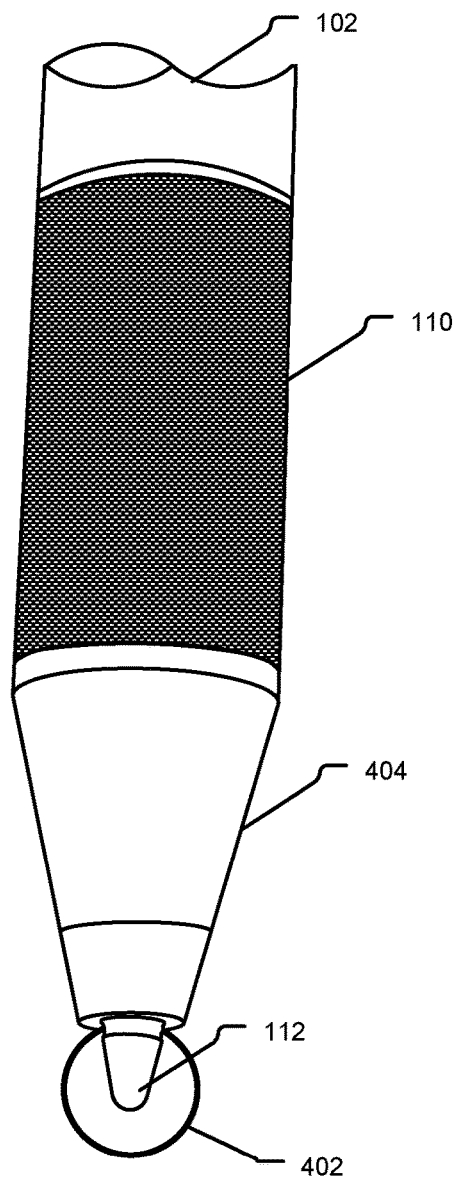
FIG. 4A and FIG. 4B illustrate replacing a nib of an active stylus, according to some embodiments.
Figure 4B:
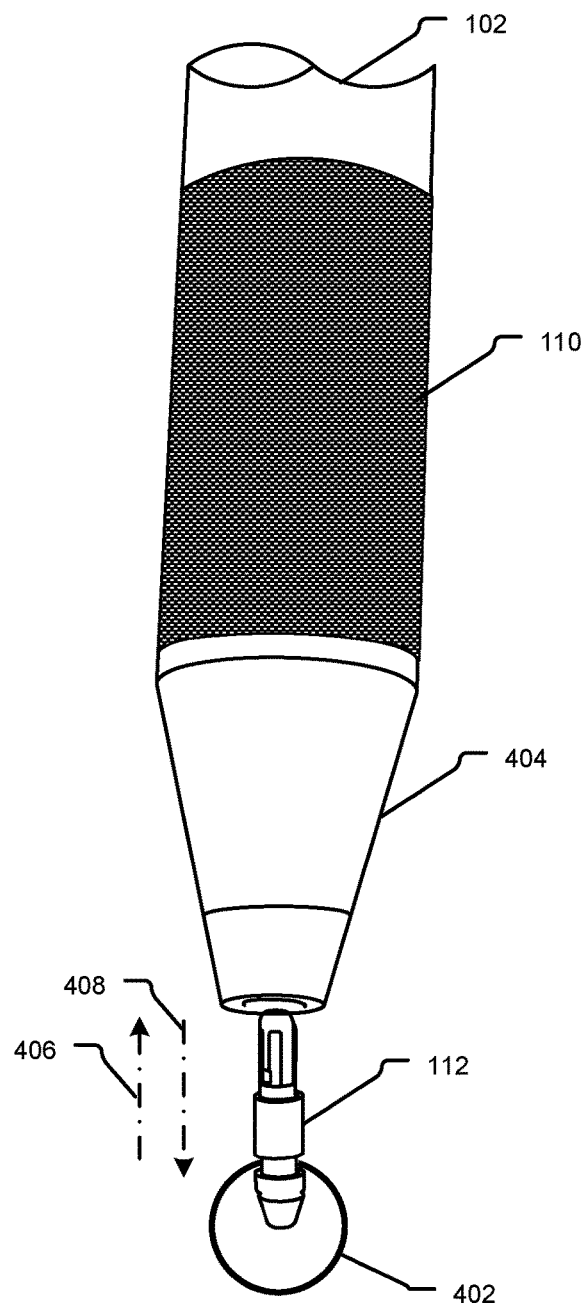

FIG. 4A and FIG. 4B illustrate replacing a nib of an active stylus, according to some embodiments. FIG. 4A illustrates using a tool 402 (e.g., provided with the stylus 102) to engage the nib 112 when the nib 112 is in the tip 404 of the stylus 102. FIG. 4B illustrates using the tool 402 (e.g., provided with the stylus 102) to pull the nib 112 out 406 of the tip 404. The tool 402 may be used to engage and push one of the spare nibs 210 in 408 to the tip 404 of the stylus 102. When not being used, the tool 402 may be stored by pulling on either side of the tool to partially separate the two sides of the tool and placing one side of the tool into the hole 306 of FIG. 3 on the top portion 106 of the stylus 102.

Figure 5A:
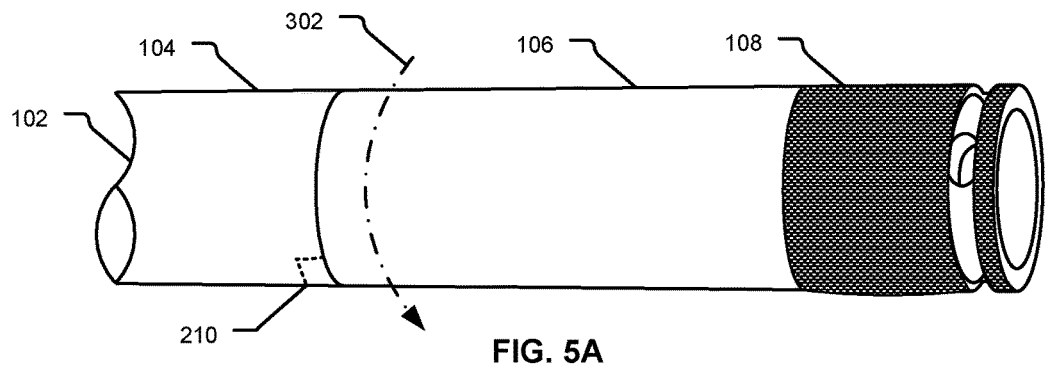
FIG. 5A, FIG. 5B, and FIG. 5C illustrate accessing a second compartment in an active stylus that stores a battery, according to some embodiments.
Figure 5B:
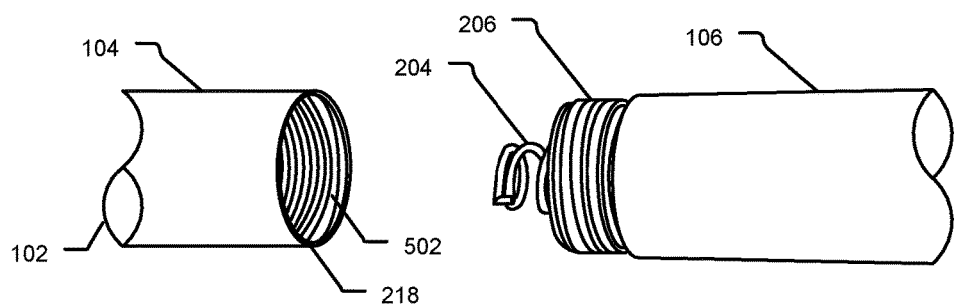
Figure 5C:
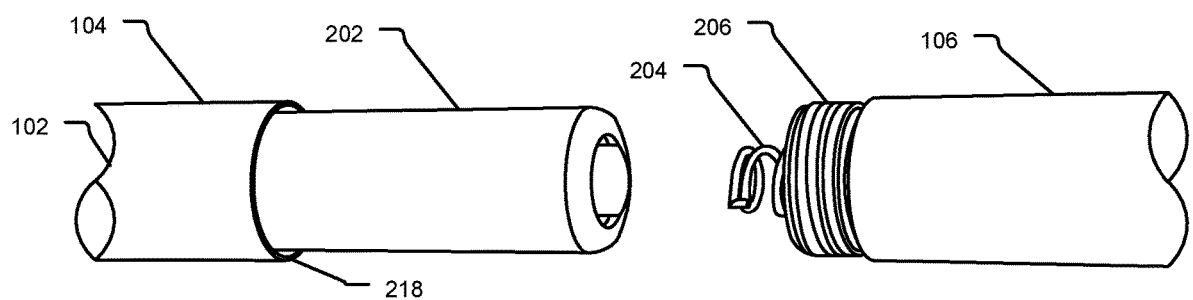

FIG. 5A, FIG. 5B, and FIG. 5C illustrate accessing a second compartment in an active stylus that stores a battery, according to some embodiments.

FIG. 5A illustrates turning the top portion 106 in a counter-clockwise direction 302 past the detent 212. For example, a user may grasp the main portion 104 using one hand and grasp the top portion 106 (e.g., at the top grip 108) using another hand and turn the top portion 106 in a counter-clockwise direction 302 until the detent 212 is reached and then continue to turn the top portion 106 in the counter-clockwise direction 302 past the detent 212.

FIG. 5B illustrates separating the top portion 106 from the main portion 104, after turning the top portion 106 in the counter-clockwise direction 302 past the detent 212, to access the dry chamber 218. For example, a user may grasp the main portion 104 using one hand and grasp the top portion 106 (e.g., at the top grip 108) using another hand and turn the top portion 106 in the counter-clockwise direction 302 past the detent 212 until the top portion 106 is completely unscrewed and detaches from the main portion 104 to enable access to the dry chamber 218. Completely unscrewed means that outer threads of the threaded wall 206 become disengaged from inner threads 502 of the main portion 104.

FIG. 5C illustrates accessing the battery 202 in the dry chamber 218. For example, after unscrewing the top portion 106 from the main portion 104 to access the dry chamber 218, the user may replace the battery 202 with a new battery.

Thus, when the top portion 106 is screwed into the main portion 104, the battery 202 and the spring 204 may be stored in the dry chamber 218 that is inside the main portion 104 of the stylus 102. Unscrewing the top portion 106 past the detent 212 (e.g., at least one and a half turns) until the top portion 106 (including the threaded wall 206) is completely unscrewed and detached from the main portion 104 enables the user to access the dry chamber 218 that is used to store the battery 202. In this way, unscrewing the top portion 106 past the detent 212, until the top portion 106 is completely unscrewed from the main portion 104, enables the user to access the dry chamber 218 to replace the battery 202.

Figure 6:
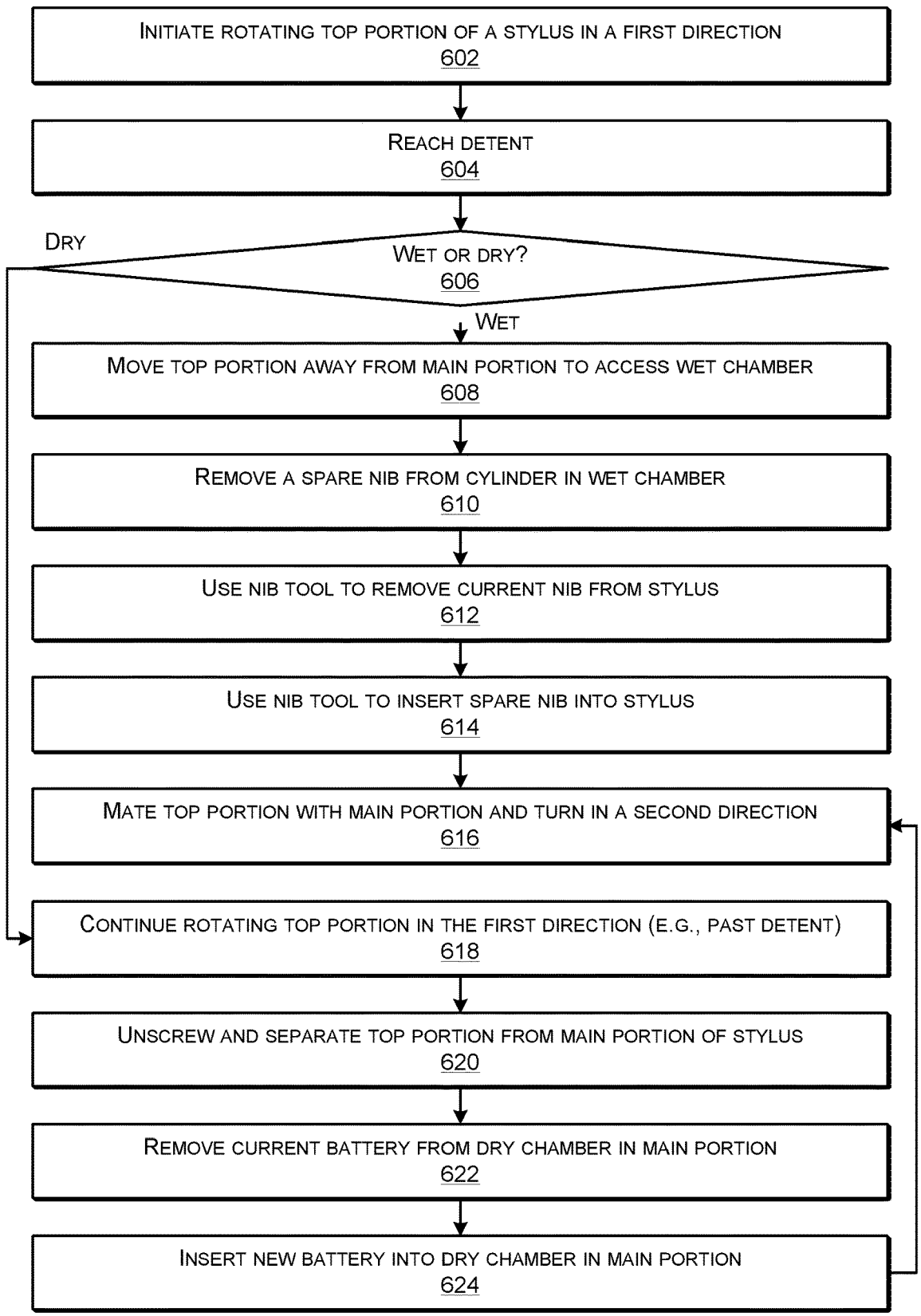
FIG. 6 is a flowchart of a process that includes rotating a top portion of an active stylus, according to some embodiments.

In the flow diagram of FIG. 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 600 is described with reference to FIGS. 1, 2, 3, 4, and 5 as described above, although other models, frameworks, systems and environments may be used to implement this process.

FIG. 6 is a flowchart of a process 600 that includes rotating a top portion of an active stylus, according to some embodiments. The process 600 may be performed by a user on the stylus 102 as described herein.

At 602, the top portion of an active stylus may be rotated (relative to a main portion of the stylus) in a first direction. At 604, a detent may be reached. At 606, a determination may be made whether to access a wet chamber or a dry chamber. For example, in FIG. 3A a user may grasp the main portion 104 using one hand and grasp the top portion 106 (e.g., at the top grip 108) using another hand and turn the top portion 106 in a counter-clockwise direction 302 until the detent 212 is reached. After reaching the detent 212, the user may determine whether to access the dry chamber 218 or the wet chamber 216 of FIG. 2.

If a determination is made, at 606, to access the wet chamber, then the top portion may be moved away (e.g., separated) from the main portion of the stylus to access the wet chamber, at 608. At 610, a spare nib may be removed from a cylinder located in the wet chamber. At 612, a nib tool may be used to remove a current nib from the stylus. At 614, the nib tool may be used to insert the spare nib into the stylus. At 616, the top portion may be mated to the main portion and the top portion may be turned in a second direction that is opposite the first direction until the top portion is completely screwed in to the main portion. For example, in FIG. 3B, after turning the top portion 106 in the counter-clockwise direction 302 until the detent 212 is reached, a user may grasp the main portion 104 using one hand and grasp the top portion 106 (e.g., at the top grip 108) using another hand and pull the top portion 106 away 304 from the main portion 104 to access the wet chamber 216. In FIG. 3C, after pulling the top portion 106 away 304 from the main portion 104 to access the wet chamber 216, the user may access one of the spare nibs 210. As illustrated in FIG. 4A, the user may use a tool 402 (e.g., provided with the stylus 102) to engage the nib 112 when the nib 112 is in the tip 404 of the stylus 102. As illustrated in FIG. 4B, the user may use the tool 402 to pull the nib 112 out 406 of the tip 404 and then use the tool 402 to engage and push one of the spare nibs 210 in 408 to the tip 404 of the stylus 102. The user may reverse the process by pushing the top portion 106 to mate with the main portion 104 and then rotating the top portion 106 in a clockwise direction.

If a determination is made, at 606, to access the dry chamber, then the top portion may continue to be rotated in the first direction (e.g., past the detent), at 618. At 620, the top portion may be unscrewed and separated from the main portion of the stylus. At 622, a current battery may be removed from the dry chamber in the main portion of the stylus. At 624, a new battery may be inserted into the dry chamber in the main portion of the stylus and the process may proceed to 616, where the top portion may be mated to the main portion and the top portion may be turned in a second direction that is opposite the first direction until the top portion is completely screwed in to the main portion. For example, in FIG. 5A, a user may grasp the main portion 104 using one hand and grasp the top portion 106 (e.g., at the top grip 108) using another hand and turn the top portion 106 in a counter-clockwise direction 302 until the detent 212 is reached and then continue to turn the top portion 106 in the counter-clockwise direction 302 past the detent 212. In FIG. 5B, the user may grasp the main portion 104 using one hand and grasp the top portion 106 (e.g., at the top grip 108) using another hand and turn the top portion 106 in the counter-clockwise direction 302 past the detent 212 until the top portion 106 is completely unscrewed and detaches from the main portion 104 to enable access to the dry chamber 218. In FIG. 5C, after unscrewing the top portion 106 from the main portion 104 to access the dry chamber 218, the user may replace the battery 202 with a new battery. The user may reverse the process by pushing the top portion 106 to mate with the main portion 104 and then rotating the top portion 106 in a clockwise direction.

Figure 7:
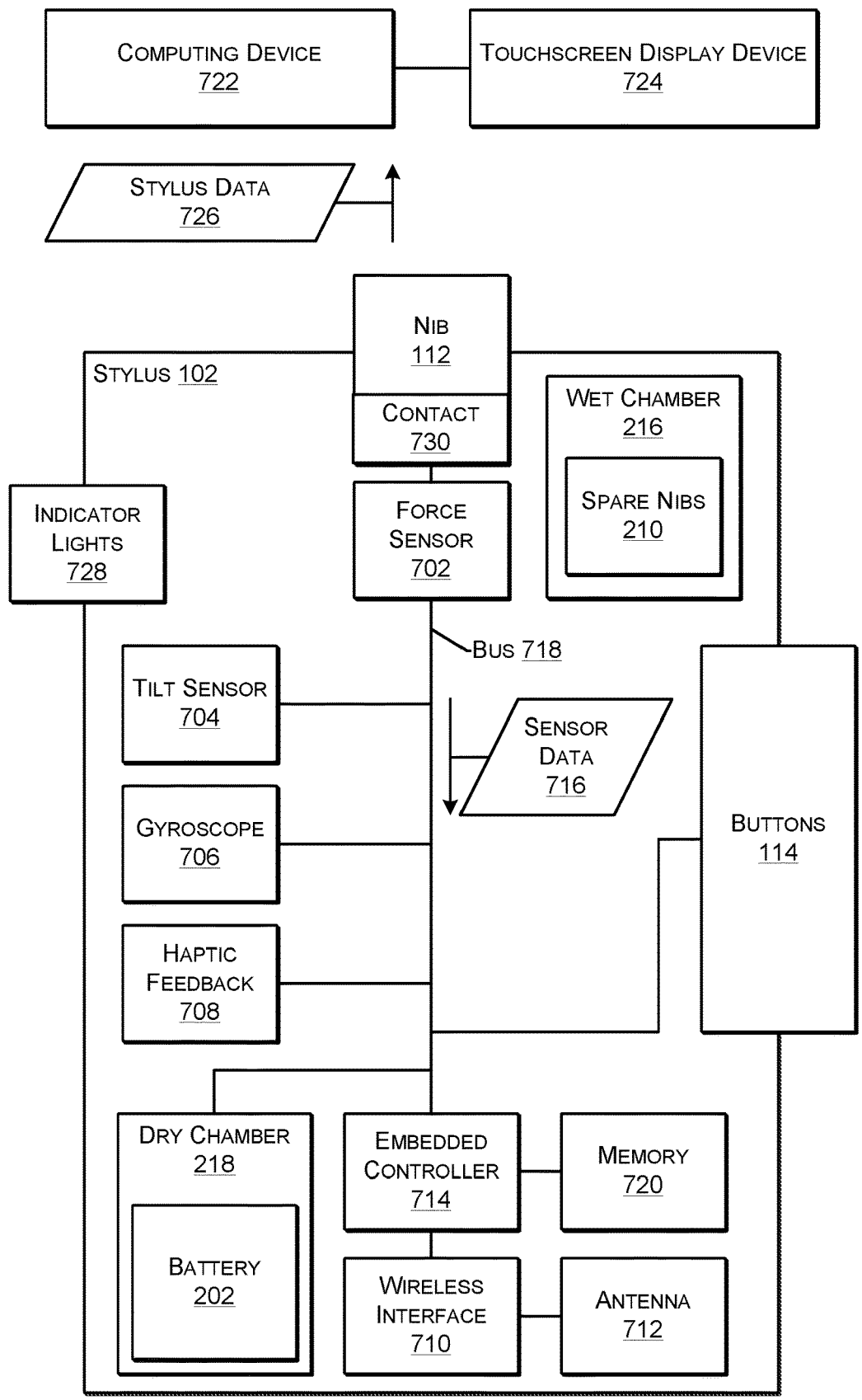
FIG. 7 illustrates an example configuration of an active stylus that can be used to implement the systems and techniques described herein.

FIG. 7 illustrates an example configuration of an active stylus that can be used to implement the systems and techniques described herein. The stylus 102 may be an active stylus and, in some cases, a ruggedized stylus designed to be operated in hostile environments (e.g., environments in which liquids, particulate matter, and the like that may be hostile to electronic products, may be present).

The stylus 102 may include the nib 112, the wet chamber 216, and the dry chamber 218. The stylus 102 may include multiple sensors, including a force sensor 702 that is coupled to the nib 112 to detect an amount of force being exerted by the nib 112 onto a surface. The multiple sensors may include a tilt sensor 704 to detect an angle at which the stylus 102 is being held relative to a surface with which the nib 112 is in contact. The multiple sensors may include a gyroscope 706 to sense angular velocity (e.g., a change in rotational angle per unit of time). The multiple sensors may include a haptic feedback sensor 708 that uses a type of eccentric rotating mass (ERM) actuator, such as, an unbalanced weight attached to a motor shaft. As the shaft rotates, the spinning of this irregular mass causes the actuator, and the stylus 102 to which the actuator is attached, to shake, providing haptic feedback to the user.

The stylus 102 may include a wireless interface 710 and an antenna 712 to enable stylus data 726 to be sent via a nearfield communication (NFC) protocol (e.g., Bluetooth, Zigbee, or the like) to a computing device 722 that is connected to a touchscreen display device 724. For example, a user may provide input to the computing device 722 by manipulating the nib 112 on the touchscreen display device 724. The stylus 102 may be paired with the computing device 722.

The stylus 102 may include an embedded controller 714, e.g., a microcontroller that is configured with logic instructions. When the nib 112 (or one of the spare nibs 210 of FIG. 2) is inserted into the stylus 102, the force sensor 702 (e.g., pressure sensor) may determine, based on the amount of pressure being exerted by the nib 112 on the force sensor 702, whether the nib 112 is properly seated. For example, when the nib 112 is properly seated, the nib 112 may exert an amount of force, F, between a predetermined range, e.g., A<F<B. If the nib 112 exerts a force of B or more, or of A or less, then the embedded controller 714 may determine that the nib 112 is not properly seated. If an amount of force (e.g., sensor data 716) measured by the force sensor 702 indicates that the nib 112 is not properly seated, the embedded controller 714 may provide a first indication, using one of the indicator lights 728 (e.g., yellow light) or using the haptic feedback sensor 708 (e.g., series of multiple brief vibrations, e.g., 200 milliseconds in length), to indicate that the nib 112 is improperly seated. If the amount of force (e.g., sensor data 716) measured by the force sensor 702 indicates that the nib 112 is properly seated, the embedded controller 714 may provide an indication, using one of the indicator lights 728 (e.g., green light) or using the haptic feedback sensor 708 (e.g., longer burst, such as 1 second), to indicate that the nib 112 is properly seated. In some cases, the embedded controller 714 may provide an indication as to whether the nib 112 is properly seated by instructing the computing device 722 to display an appropriate message, e.g., "Nib properly inserted" or "Nib not inserted properly—please re-insert."

In some cases, the nib 112 (and the spare nibs 210) may include a contact 730 around the circumference of the end of the nib 112 that is placed inside the stylus 102. The embedded controller 714 may use the contact 730 to determine whether the nib 112 (or one of the spare nibs 210) is seated properly. For example, when the nib 112 is properly seated, the contact 730 may complete a circuit (e.g., embedded controller 714 detects a closed circuit) and when the nib 112 is improperly seated, the contact 730 may not complete the circuit (e.g., embedded controller 714 detects an open circuit). If the embedded controller 714 is unable to detect the contact 730, then the embedded controller 714 may provide a first indication, using one of the indicator lights 728 (e.g., yellow light) or using the haptic feedback sensor 708 (e.g., series of multiple brief vibrations, e.g., 200 milliseconds in length), to indicate that the nib 112 is improperly seated. If the embedded controller 714 is able to detect the contact 730, then the embedded controller 714 may provide an indication, using one of the indicator lights 728 (e.g., green light) or using the haptic feedback sensor 708 (e.g., longer burst, such as 1 second), to indicate that the nib 112 is properly seated. In some cases, the embedded controller 714 may provide an indication as to whether the nib 112 is properly seated by instructing the computing device 722 to display an appropriate message, e.g., "Nib properly inserted" or "Nib not inserted properly—please re-insert."

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An active stylus comprising:
    a main portion comprising:
        a dry chamber having a tubular shape; and
        a threaded wall that includes a male coupler;
    a top portion comprising:
        a wet chamber to store a detent; and
        a female coupler having inner threads located on an inner surface of the top portion to mate with exterior threads of the male coupler of the threaded wall;
    wherein:
        the top portion is configured to mate with the main portion by attaching the male coupler to the female coupler to seal the dry chamber to prevent foreign matter from entering into the dry chamber;
        turning the top portion less than one turn, in a first direction, relative to the main portion until the detent is reached and pulling the top portion from the main portion to disengage, without detaching, the top portion from the main portion provides access to the wet chamber; and
        turning the top portion at least one and a half turns in the first direction, relative to the main portion, past the detent, until the top portion detaches from the main portion, enables access to the dry chamber.

2. The active stylus of claim 1, wherein at least one of the top portion or the main portion are comprised of one of:
    carbon fiber,
    aluminum or an aluminum alloy;
    a titanium alloy;
    high-density polyethylene (HDPE); or
    polyoxymethylene (POM).

3. The active stylus of claim 1, wherein:
    the top portion includes a knurled top grip; and
    the main portion includes a knurled bottom grip.

4. The active stylus of claim 1, further comprising:
    one or more mechanical buttons that are sealed using a boot.

5. The active stylus of claim 1, wherein:
    the dry chamber stores a battery to power the active stylus.

6. The active stylus of claim 1, wherein the wet chamber further comprises:
    a cylinder; and
    a plurality of spare nibs.

7. The active stylus of claim 1, wherein the top portion further comprises:
    a hole in which to store a tool, the tool used to perform at least one of:
        removing a current nib; or
        attaching a new nib.

8. A ruggedized active stylus comprising:
    a main portion comprising:
        a tip into which a nib is inserted;
        a dry chamber having a tubular shape; and
        a threaded wall that includes a male coupler;
    a top portion comprising:
        a wet chamber to store a detent; and
        a female coupler having inner threads located on an inner surface of the top portion to mate with exterior threads of the threaded wall;
    wherein:
        the top portion is configured to mate with the main portion by attaching the male coupler to the female coupler to seal the dry chamber to prevent foreign matter from entering into the dry chamber;
        turning the top portion less than one turn, in a first direction, relative to the main portion until the detent is reached and pulling the top portion from the main portion to disengage, without detaching, the top portion from the main portion provides access to the wet chamber; and
        turning the top portion at least one and a half turns in the first direction, relative to the main portion, past the detent, until the top portion detaches from the main portion, enables access to the dry chamber.

9. The ruggedized active stylus of claim 8, further comprising:
    one or more mechanical buttons that are sealed using a boot.

10. The ruggedized active stylus of claim 8, wherein at least one of the top portion or the main portion are comprised of one of:
    carbon fiber,
    aluminum or an aluminum alloy;
    a titanium alloy;
    high-density polyethylene (HDPE); or
    polyoxymethylene (POM).

11. The ruggedized active stylus of claim 8, wherein:
    the top portion includes a knurled top grip; and
    the main portion includes a knurled bottom grip.

12. The ruggedized active stylus of claim 8, wherein:
    the dry chamber stores a battery to power the ruggedized active stylus.

13. The ruggedized active stylus of claim 8, wherein the wet chamber further comprises:
    a cylinder; and
    a plurality of spare nibs.

14. The ruggedized active stylus of claim 8, wherein the top portion further comprises:
    a hole that stores a tool to:
        remove a current nib; or
        attach a new nib.

15. A computing device comprising:
    a touchscreen display device; and
    an active stylus comprising:
        a main portion comprising:
            a dry chamber having a tubular shape; and
            a threaded wall that includes a male coupler;
        a top portion comprising:
            a wet chamber to store a detent; and
            a female coupler having inner threads located on an inner surface of the top portion to mate with exterior threads of the male coupler of the threaded wall;
        wherein:
            the top portion is configured to mate with the main portion by attaching the male coupler to the female coupler to seal the dry chamber to prevent foreign matter from entering into the dry chamber;
            turning the top portion less than one turn, in a first direction, relative to the main portion until the detent is reached and pulling the top portion from the main portion to disengage, without detaching, the top portion from the main portion provides access to the wet chamber; and
            turning the top portion at least one and a half turns in the first direction, relative to the main portion, past the detent, until the top portion detaches from the main portion, enables access to the dry chamber.

16. The computing device of claim 15, wherein at least one of the top portion or the main portion of the active stylus are comprised of one of:
   carbon fiber,
   aluminum or an aluminum alloy;
   a titanium alloy;
   high-density polyethylene (HDPE); or
   polyoxymethylene (POM).

17. The computing device of claim 15, wherein the active stylus further comprises:
   one or more mechanical buttons that are sealed using a boot.

18. The computing device of claim 15, wherein:
   the top portion includes a knurled top grip; and
   the main portion includes a knurled bottom grip.

19. The computing device of claim 15, wherein:
   the dry chamber stores a battery to power the active stylus.

20. The computing device of claim 15, wherein the wet chamber of the active stylus further comprises:
   a cylinder; and
   a plurality of spare nibs.

\* \* \* \* \*